(12) United States Patent
Osanlou

(10) Patent No.: US 11,846,513 B2
(45) Date of Patent: Dec. 19, 2023

(54) METHOD FOR DEFINING A PATH

(71) Applicant: SAFRAN ELECTRONICS & DEFENSE, Paris (FR)

(72) Inventor: Kevin Osanlou, Paris (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 265 days.

(21) Appl. No.: 17/601,873

(22) PCT Filed: Apr. 9, 2020

(86) PCT No.: PCT/EP2020/060187
§ 371 (c)(1),
(2) Date: Oct. 6, 2021

(87) PCT Pub. No.: WO2020/208153
PCT Pub. Date: Oct. 15, 2020

(65) Prior Publication Data
US 2022/0170751 A1    Jun. 2, 2022

(30) Foreign Application Priority Data
Apr. 12, 2019 (FR) ...................... 1903913

(51) Int. Cl.
*G01C 21/34* (2006.01)
*G01C 21/36* (2006.01)
*G06N 7/01* (2023.01)

(52) U.S. Cl.
CPC ....... *G01C 21/343* (2013.01); *G01C 21/3476* (2013.01); *G01C 21/3605* (2013.01); *G06N 7/01* (2023.01)

(58) Field of Classification Search
CPC .............. G01C 21/343; G01C 21/3476; G01C 21/3605; G06N 7/01
See application file for complete search history.

(56) References Cited

PUBLICATIONS

Osanlou et al.; "Constrained shortest path search with graph convolutional neural networks"; 2018, Cornell University, arXiv.org, https://doi.org/10.48550/arXiv.2108.00978, pp. 1-12 (Year: 2018).*
Jun. 26, 2020 International Search Report issued in International Patent Application No. PCT/EP2020/060187.
Osanlou et al; "Constrained Shortest Path Search with Graph Convultional Neural Networks;" pp. 1-12; Jan. 1, 2018.

* cited by examiner

*Primary Examiner* — Tarek Elarabi
(74) *Attorney, Agent, or Firm* — Williams Mullen; R. Brian Drozd

(57) ABSTRACT

A path is defined to be followed by a vehicle in an environment represented by a graph of nodes connected by edges. Each node represents the vehicle's position. Each edge between two nodes indicates a transition cost between the two nodes. An instance of the graph, which is represented by a start node, a destination node and mandatory nodes through which the vehicle must pass, is obtained. An initial order of travel through the mandatory nodes is obtained by applying a procedure, using a graph convolutional neural network, adapted to the graph, to the instance. A procedure of local optimisation of the mandatory nodes is executed in order to obtain an optimised order. A path for the instance is defined to be resolved: from the optimised order and for each pair of nodes of the instance to be resolved, from a shortest path between the nodes of the pair.

8 Claims, 6 Drawing Sheets

METHOD FOR DEFINING A PATH

TECHNICAL FIELD

The invention relates to a method for defining a path to be followed by a vehicle in an environment represented by a graph of nodes connected by edges, each node of said graph representing a position that can be adopted by said vehicle, each edge between two nodes being associated with a transition cost between the two nodes, and a device and a system implementing the method.

PRIOR ART

The past years have seen so-called autonomous vehicles appear, capable of moving in an environment autonomously, i.e. without human intervention, or semi-autonomously, i.e. with limited human intervention. These autonomous vehicles include motor vehicles capable of travelling on roads in the company of other vehicles, and drones flying, driving or navigating under or on water.

In general these autonomous vehicles are expected to reach a destination point, also referred to as a node, from a point of departure without specifying to it the path to be followed to reach the destination point. In some cases, the path may be constrained, the autonomous vehicle having to pass through one or more mandatory positions between the point of departure and the destination point.

Generally, the number of positions that the autonomous vehicle can adopt in its environment is not infinite, which makes it possible to represent said environment in the form of a graph of nodes connected by edges. In this graph, each edge connecting two nodes can be associated with a weight representing a transition cost between the two nodes.

FIG. 1 illustrates a graph G representing an environment wherein a vehicle can move.

The graph G comprises eight nodes connected by edges. Each edge is associated with a weight. For example, the edge between the node 1 and the node 2 is associated with a weight of value 2. In one example, a vehicle V must travel in the graph G from a node 1 to a node 6, necessarily passing at least once through a node 3. Hereinafter, a triplet consisting of a start node, a destination node and a set of mandatory nodes is referred to as an instance of the graph G denoted I(S, D, M), S being the start node, D being the destination node and M being all the mandatory nodes. Moreover, a procedure for seeking a best path in a graph G for an instance I(S, D, M) of said graph is referred to as a resolution of the instance I(S, D, M). An instance resolution consists in seeking the path minimising a total transition cost, the total transition cost being a sum of transition costs between each pair of successive nodes making up said path. In the example of FIG. 1, the instance to be resolved is therefore I (node 1, node 6, {node 3}). Resolving this instance gives an order of travel through a set of nodes, from the node 1 to the node 6. The following order of travel is thus obtained.

{node 1, node 2, node 5, node 3, node 5, node 6}.

In the example of FIG. 1, the graph G comprises few nodes. For a number of nodes of this order, resolving an instance is relatively simple, even if this instance comprises mandatory nodes. It is in fact possible to exhaustively test in a reasonable time each possible combination of series of nodes to find the one that resolves the instance with a minimum cost. Such an optimisation method would be inapplicable for graphs comprising a large number of nodes, all the more so with instances to be resolved comprising a large number of mandatory nodes.

Known methods exist for resolving instances in a graph comprising a large number of nodes such as the 2-opt and 3-opt methods, the Lin-Kernighan heuristic, etc. These methods do however have very long resolution times, or, when the resolution time is constrained, generate highly sub-optimum solutions.

It is desirable to overcome these drawbacks of the prior art. It is in particular desirable to propose a method that makes it possible to resolve an instance comprising a large set of mandatory nodes in a graph comprising a large number of nodes optimally or almost optimally in a reasonable time.

DISCLOSURE OF THE INVENTION

According to a first aspect of the present invention, the present invention relates to a method for defining a path to be followed by a vehicle in an environment represented by a graph of nodes connected by edges, each node of said graph representing a position that can be adopted by said vehicle, each edge between two nodes being associated with a transition cost between the two nodes. The method comprises: obtaining an instance of said graph, referred to as an instance to be resolved, each instance being represented by a start node, a destination node and a set of mandatory nodes through which the vehicle must pass, said start, destination and mandatory nodes forming the nodes of the instance to be resolved; obtaining information representing an initial order of travel through said mandatory nodes by applying a procedure, using a graph convolutional neural network, referred to as a GCNN, adapted to said graph, to said instance to be resolved; executing a procedure of local optimisation of the order of the mandatory nodes in order to obtain an optimised order of the mandatory nodes, said procedure being initialised with said information representing the initial order; defining a path for said instance to be resolved from the optimised order of the mandatory nodes and, for each pair of nodes of said instance to be resolved, from a shortest path between the nodes of said pair.

According to one embodiment, the procedure using the GCNN is an iterative procedure taking an instance of the graph as an input, referred to as the input instance, and generating information representing an initial order of travel through the mandatory nodes of the input instance as an output, referred to as output information, and comprising, at each iteration: applying the GCNN to said input instance in order to obtain, for each node of the graph, a value representing a probability of being the next mandatory node to be passed through following the start node of the input instance; identifying the mandatory node in the set of mandatory nodes of the input instance having the highest probability; inserting the mandatory node identified in an ordered list of mandatory nodes; replacing the start node of the input instance with the mandatory node identified and removing the mandatory node identified from the set of mandatory nodes of the input instance; the iterations ending when a number of nodes in the set of mandatory nodes of the input instance is equal to one, the mandatory node remaining in the set of mandatory nodes of the input instance being inserted in said ordered list and said ordered list forming the output information.

According to one embodiment, the procedure for local optimisation of the order of mandatory nodes is an iterative procedure taking an instance, referred to as the initial instance, and information representing an order of mandatory nodes, referred to as the initial order, as an input and generating information representing an optimised order of mandatory nodes as an output, referred to as the optimised order, each item of information representing an order of mandatory nodes being a list of ordered mandatory nodes, and comprises at each iteration: determining a pair of mandatory nodes, referred to as pivot nodes, among the mandatory nodes of the ordered list of mandatory nodes of the initial order, referred to as the initial list, and obtaining a modified ordered list of mandatory nodes, referred to as the modified list, wherein the mandatory nodes of the initial list located between the two pivot nodes have been inverted symmetrically, the pair of pivot nodes determined being different from all pairs of pivot nodes already used for modifying the order of the mandatory nodes in the initial list; defining information representing the order of the mandatory nodes in the modified list as being a temporary optimised order when a total transition cost of a path between the start and destination nodes of the initial instance following the order of the mandatory nodes in the modified list is lower than a total transition cost of said path following the order of the mandatory nodes in the initial list; and defining the temporary optimised order as being the initial order; ending the iterations of the local optimisation procedure when a stop condition is fulfilled, the optimised order being the last temporary optimised order obtained by the local optimisation procedure.

According to one embodiment, the GCNN was adapted to said graph during a prior adaptation phase, the prior adaptation phase comprising a learning procedure for adapting parameters of a convolution phase and of a linear combination phase of said GCNN, referred to as GCNN parameters, the learning procedure being an iterative procedure comprising at each iteration: generating a random instance of the graph; applying the procedure using the GCNN to the random instance in order to obtain a first item of information representing an order of the mandatory nodes of the random instance, referred to as a first item of information; generating a second item of information representing an order of the mandatory nodes of the random instance defined randomly, referred to as a second item of information; obtaining a first and a second item of information representing an order of the optimised mandatory nodes, referred to as first and second optimised items of information, applying the local optimisation procedure respectively to the order of the mandatory nodes corresponding to the first and second items of information; selecting the order represented by said first or by said second optimised item of information making it possible to minimise a total transition cost of a path between the start and destination nodes of the random instance; forming a new instance from each mandatory node of the random instance, each new instance having as its start node the mandatory node corresponding to the new instance, as its destination node the destination node of the random instance and as a set of mandatory nodes the nodes following the mandatory node used as the start node of the new instance in the selected order; and, for the random instance and each new instance, forming a pair by associating said instance with a next mandatory node to be passed through for said instance, said next mandatory node to be passed through being the mandatory node following the start node of said instance in the selected order; updating a learning window with the pairs thus formed; changing the parameters of the GCNN to minimise an error in prediction by the GCNN of a next mandatory node to be passed through using the next mandatory node of pairs of the learning window as a reference of next mandatory nodes to be passed through to be obtained by the GCNN.

According to a second aspect of the invention, the invention relates to a device for defining a path to be followed by a vehicle in an environment represented by a graph of nodes connected by edges, each node of said graph representing a position that can be adopted by said vehicle, each edge between two nodes being associated with a transition cost between the two nodes. The device comprises: obtaining means for obtaining an instance of said graph, referred to as the instance to be resolved, each instance being represented by a start node, a destination node and a set of mandatory nodes through which the vehicle must pass, said start, destination and mandatory nodes forming the nodes of the instance to be resolved; obtaining means for obtaining information representing an initial order of travel through said mandatory nodes by applying a procedure, using a graph convolutional neural network, referred to as a GCNN, adapted to said graph, to said instance to be resolved; execution means for executing a procedure for local optimisation of the order of the mandatory nodes in order to obtain an optimised order of the mandatory nodes, said procedure being initialised with said information representing the initial order; definition means for defining a path for said instance to be resolved from the optimised order of the mandatory nodes and, for each pair of nodes of the instance to be resolved, from a shortest path between the nodes of said pair.

According to a third aspect of the invention, the invention relates to a vehicle comprising a device according to the second aspect.

According to a fourth aspect of the invention, the invention relates to a computer program comprising instructions for implementing, by a device, the method according to the first aspect, when said program is executed by a processor of said device.

According to a fifth aspect of the invention, the invention relates to storage means, characterised in that they store a computer program comprising instructions for executing, by a device, the method according to the first aspect, when said program is executed by a processor of said device.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

Figure 1:
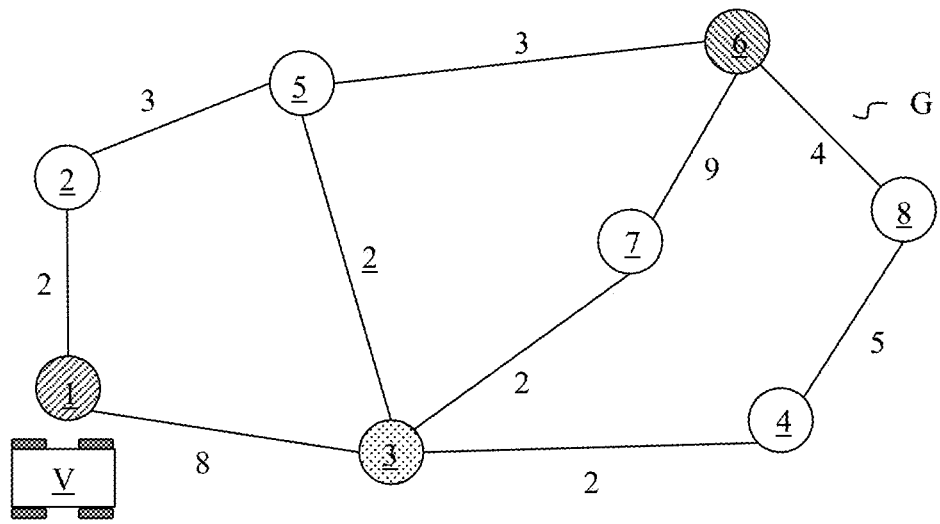
FIG. 1 illustrates a graph representing an environment in which a vehicle can move.

The invention is described hereinafter in a context of a travelling autonomous vehicle travelling in an environment represented by a graph, such as the vehicle V in the graph G described in relation to FIG. 1, the graph G not being oriented. A graph is said to be oriented when at least one transition cost between two nodes of the graph is dependent on the direction of the transition between the two nodes. The invention is however adapted to other types of autonomous or semi-autonomous vehicle, such as a flying drone or one sailing on or under water, and moving in an environment that can be represented by a graph, oriented or not.

The method for defining a path to be followed by a vehicle in its environment is represented by a method for resolving an instance of a graph. As described hereinafter, this method can operate in real time, this method being capable of resolving an instance very quickly and providing an almost optimum path for the vehicle V by relying on a graph convolutional neural network, referred to as a GCNN. The GCNN comprises parameters obtained using an iterative learning procedure that can be implemented during a non-real-time phase, prior to any movement of the vehicle V.

In one embodiment, the vehicle V comprises a processing module 10 implementing the method for defining a path according to the invention. In this embodiment, the processing module 10 also implements the iterative learning procedure for determining the parameters of the neural network.

In other embodiments, the processing module 10 is a module external to the vehicle V that receives an instance to be resolved and communicates to the vehicle V a result of the method for defining a path for said instance, i.e. a path to be followed by the vehicle V.

Figure 2:
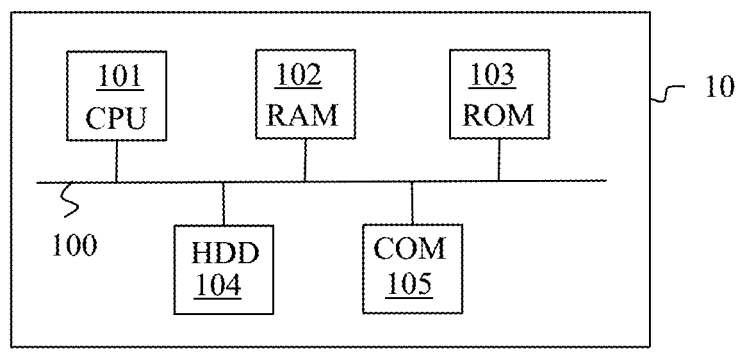
FIG. 2 illustrates schematically a hardware architecture of a processing module able to implement the invention.

FIG. 2 illustrates schematically an example of a hardware architecture of the processing module 10.

According to the example of hardware architecture shown in FIG. 2, the processing module 10 then comprises, connected by a communication bus 100: a processor or CPU (central processing unit) 101; a random access memory RAM 102; a read only memory ROM 103; a storage unit such as a hard disk or a storage medium reader, such as an SD (Secure Digital) card reader 104; at least one communication interface 105 enabling for example the processing module 10 to communicate characteristics of a path to be followed by the vehicle V to a module controlling the movements of the vehicle V.

The processor 101 is capable of executing instructions loaded into the RAM 102 from the ROM 103, from an external memory (not shown), from a storage medium (such as an SD card), or from a communication network. When the processing module 10 is powered up, the processor 101 is capable of reading instructions from the RAM 102 and executing them. These instructions form a computer program causing the complete or partial execution, by the processor 101, of the method described below in relation to FIG. 3 and of the method described in relation to FIG. 6.

Figure 3:
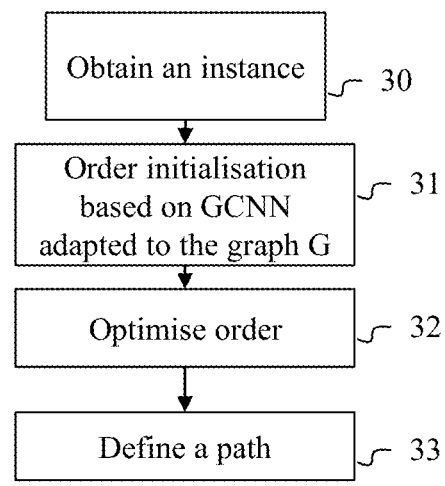
FIG. 3 illustrates schematically a method for defining a path of a vehicle according to the invention.
Figure 6:
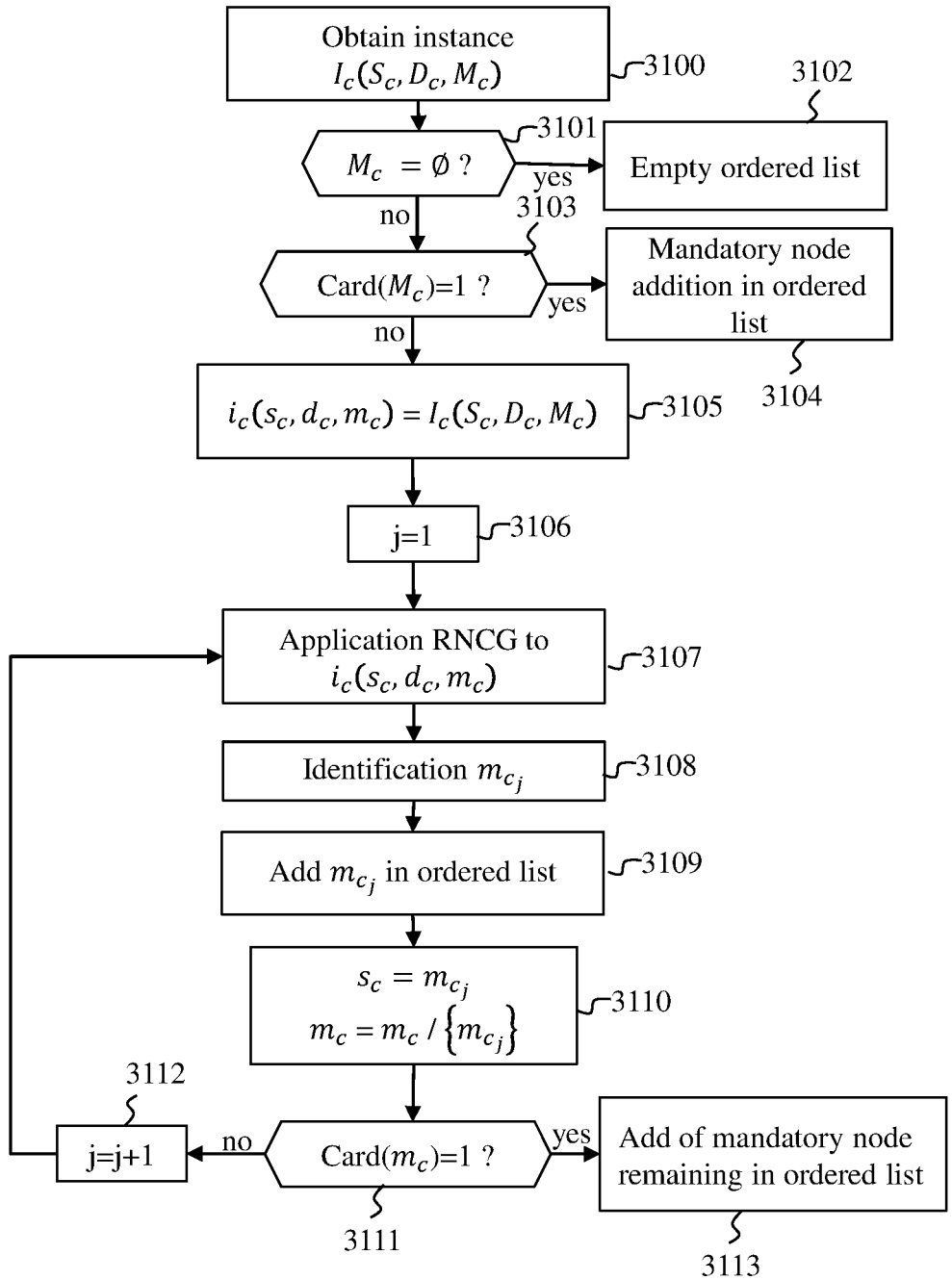
FIG. 6 illustrates schematically an iterative procedure for determining an order of travel through mandatory nodes for an instance of a graph based on the graph convolutional neural network.

The method described in relation to FIG. 3 and the method described in relation to FIG. 6 can be implemented in software form by executing a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

FIG. 3 illustrates schematically a method for defining a path of a vehicle according to the invention.

In a step 30, the processing module 10 obtains an instance to be resolved $I_R$ ($S_R$, $D_R$, $M_R$) of a graph G. The instance $I_R$ ($S_R$, $D_R$, $M_R$) is therefore represented by a start node $S_R$, a destination node $D_R$ and a set of mandatory nodes $M_R$. The set of mandatory nodes $M_R$ may be empty or comprise one or more mandatory nodes. The start node $S_R$, the destination node $D_R$ and the set of mandatory nodes $M_R$ form the nodes of the instance $I_R(S_R, D_R, M_R)$.

In a step 31, the processing module 10 obtains information representing an initial order of travel through the mandatory nodes of the set of mandatory nodes $M_R$ between the start node $S_R$ and the destination node $D_R$ by applying a procedure described in relation to FIG. 6 to the instance $I_R$ ($S_R$, $D_R$, $M_R$). The procedure of FIG. 6 uses a GCNN adapted to the graph G. An application of said GCNN to an instance of a graph is described in relation to FIG. 4. The adaptation of the GCNN to the graph G consists of a preliminary adaptation phase. This preliminary adaptation phase relies on an iterative learning procedure described in relation to FIG. 5 during which parameters of the GCNN are determined. The information representing an initial order of travel through the mandatory nodes of the set of mandatory nodes $M_R$ is an ordered list of mandatory nodes.

In a step 32, the processing module 10 performs a procedure of local optimisation of the order of the mandatory nodes in order to obtain an optimised order of the mandatory nodes, said procedure being initialised with the information representing the initial order obtained at the step 31. The procedure of local optimisation of the order of the mandatory nodes is described in relation to FIG. 7.

In a step 33, the processing module 10 defines a path for the instance $I_R$ ($S_R$, $D_R$, $M_R$) from the optimised order of the mandatory nodes and, for each pair of nodes of the instance $I_R$ ($S_R$, $D_R$, $M_R$), from a shortest path between the nodes of said pair.

Figure 4:
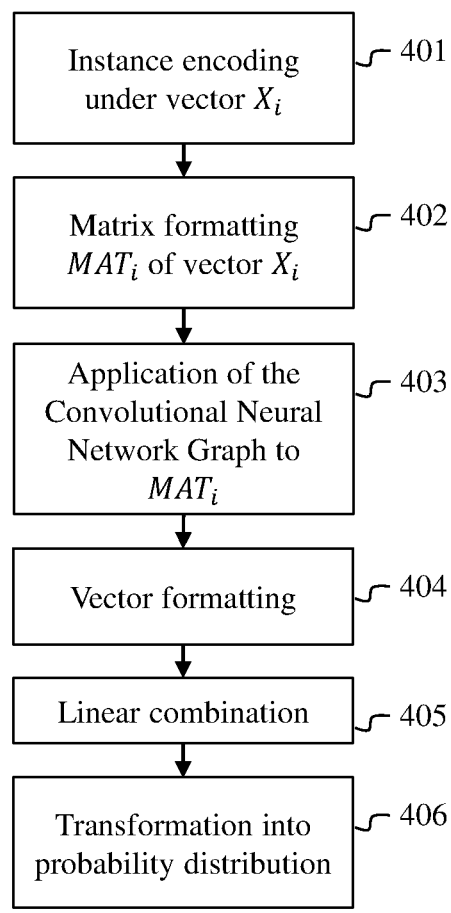
FIG. 4 illustrates schematically a procedure for applying a graph convolutional neural network to an instance of a graph.

FIG. 4 illustrates schematically a procedure for applying a GCNN to an instance I(S, D, M) of the graph G.

In a step 401, the processing module 10 encodes an instance I(S, D, M) of the graph G in the form of a one-dimensional vector X. In one embodiment, during this encoding, each node of the graph G is encoded according to a number $NB_A=3$ of attributes (A1, A2, A3):
 A1=1 if the node is a start node for the instance I(S, D, M), A1=0 otherwise;
 A2=1 if the node is a destination node for the instance I(S, D, M), A2=0 otherwise;
 A3=1 if the node is an mandatory node for the instance I(S, D, M), A3=0 otherwise.

It is supposed here that the nodes of the graph G are ordered. At the end of the encoding, the nodes of the graph G appear in the vector $X_i$ in this order in the form of triplets of attributes (A1, A2, A3).

In a step 402, the processing module 10 puts the vector $X_i$ in the form of a matrix $MAT_i$ having a number of rows equal to the number of nodes $NB_A$ in the graph G and a number of columns equal to the number $NB_A$ of attributes used. There is therefore a change from a one-dimensional vector $(X_i)$ to a two-dimensional vector $(MAT_i)$.

In a step 403, the processing module 10 applies the GCNN to the matrix $MAT_i$.

An application of a convolutional neural network in general comprises a plurality of phases, including the following phases:
 a convolution phase or a plurality of consecutive convolution phases;

a phase of vectorisation (putting in vector form) of the output data of the convolution phase or phases;

a linear combination phase, referred to as "fully connected".

Each convolution phase is generally broken down into three sub-phases:

a sub-phase of convolution, by a convolution kernel, of input data for obtaining a set of characteristics representing said input data. The characteristics obtained are not predefined but learned by the neural network during a training phase. During the training phase, the convolution kernel develops so as to "learn" to extract characteristics relevant for a given problem, a "pooling" sub-phase the purpose of which is to reduce the size of the data that it receives as an input (resulting from the convolution), while preserving the important characteristics of these input data. The "pooling" phase makes it possible to reduce the number of calculations in the convolutional neural network, a sub-phase of applying an activation function consisting in applying a mathematical function, known as an activation function, to the data obtained at the output of each convolution (or of the pooling phase if there is one). The term activation function comes from a biological equivalent activation potential, which represents a stimulation threshold which, once reached, causes a response of a neurone.

When a neural network is used in a method for classifying or predicting values, the linear combination phase always constitutes the last phase of a neural network, whether or not it is convolutional. This phase receives a vector as an input, referred to as an input vector, and produces a new vector as an output, referred to as an output vector. For this purpose, it applies a linear combination to the components of the input vector. The linear combination phase makes it possible to classify the input data of the neural network according to a number of predefined classes N. It therefore returns an output vector of size N. Each component of the output vector is associated with a class and represents a probability of the input data of the neural network belonging to said class. Each component of the input vector may contribute differently to the output vector. To do this, when the linear combination is applied, a different weight is applied to each component according to an importance that it is wished to give to the characteristic that this component represents. The linear combination of the linear combination phase is generally followed by a phase of transformation of the output vector into a probability distribution. The convolutional neural network learns the values of the weights of the linear combination phase in the same way as it learns to change the convolution kernel of each convolution phase.

As we describe hereinafter, the GCNN used in the invention applies a plurality of convolution phases to a graph. Said convolution phases do not comprise a "pooling" sub-phase and comprise a sub-phase of applying an activation function implemented by the function ReLU( ) such that ReLU(x)=max (0, x).

In one embodiment, the convolution kernel used in the invention is derived from the article by Thomas N Kipf and Max Welling. Semi-supervised classification with graph convolutional networks. ICLR 2017. This article proposes an equation combining convolution and application of an activation function.

$$H^{(l+1)}=\sigma(\tilde{D}^{-1/2}\tilde{A}\tilde{D}^{-1/2}H^{(l)}W^{(l)})$$

Figure 5:
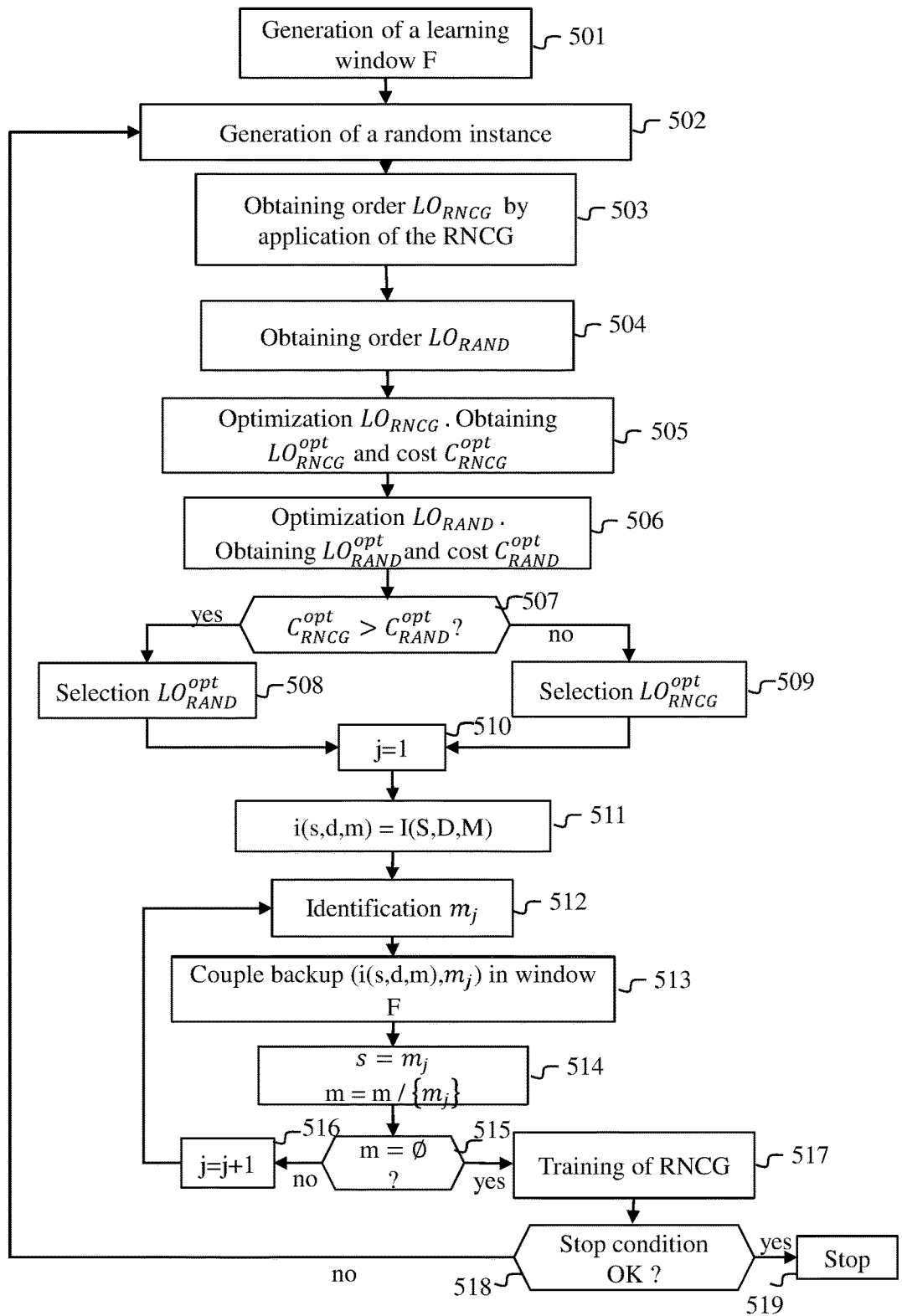
FIG. 5 illustrates schematically a procedure for learning parameters of a graph convolutional neural network.

$H^{(l+1)}$ represents output data resulting from an application of a convolution by a convolution kernel and of an activation function to input data $H^{(l)}$. $\tilde{A}=A+I$, A being an adjacency matrix of the graph G and I being an identity matrix. $\tilde{D}$ is a matrix of degrees of $\tilde{A}$, i.e. a diagonal matrix such that $\tilde{D}_{ii}=\Sigma_j\tilde{A}_{ij}$. $W^{(l)}$ is a matrix of specific weight with a convolution phase l. These weights change during the training phase so as to teach the neural network to extract relevant characteristics of each instance of the graph G. The purpose of the preliminary phase of adaptation to the graph G using the iterative learning procedure described in relation to FIG. 5 is to determine the weights (or parameters) of each matrix $W^{(l)}$. $\sigma$ is an activation function. In one embodiment, the activation function $\sigma$ used is the function ReLU( ) such that ReLU(x)=max (0, x).

In one embodiment, the GCNN applied during the step 403 is multilayer, i.e. it comprises a plurality of convolution phases. For example, the GCNN uses four convolution phases.

Each convolution phase of the GCNN receives as an input a matrix, referred to an input matrix, of NBC_IN columns and NBL_IN rows and generates as an output a matrix, referred to as an output matrix, of NBL_OUT rows and NBC_OUT columns. The input matrix $H^{(0)}$ of the first convolution phase of the GCNN is the matrix $MAT_i$. When two convolution phases of GCNN follow each other, the output matrix of the first convolution phase becomes the input matrix of the following convolution phase. Each component of an output matrix represents characteristics of the components of the input matrix (and therefore of the matrix $MAT_i$). Each input matrix (and respectively each output matrix) comprises NBL_IN=$NB_G$ rows (and respectively NBL_OUT=$NB_G$ rows). Each output matrix (and therefore respectively each input matrix as from the second convolution phase of the GCNN) may comprise a number of columns NBC_OUT (and respectively NBC_IN) that is fixed or variable from one convolution phase to the other. In one embodiment NBC_OUT=10.

It is considered here that each convolution phase classifies the input data into a number of classes equal to the number of components of the output matrix (i.e. into a number of classes equal to NBL_OUT×NBC_OUT).

In a step 404, the processing module 10 puts the output matrix resulting from the last convolution phase of the GCNN in the form of a vector $Y_i$ of NBL_OUT×NBC_OUT components by putting each row of said output matrix end to end.

In a step 405, the processing module 10 applies a linear ("fully connected") combination phase to the vector $Y_i$. The linear combination phase generates a vector $O_i$ of components $O_{ij}$ (j ranging from 1 to $NB_G$) from the vector $Y_i$. Each component $O_{ij}$ is calculated as follows:

$$O_{ij}=Y_i \cdot W_{ij}+b_{ij}$$

where $W_{ij}$ is a weight of a vector $W_i$ and $b_{ij}$ is a bias of a bias vector $b_i$ and $Y_i \cdot W_{ij}$ is a scalar product. Each node of the graph G is associated with a component of the vector $O_i$, each component being a real number representing a probability of the corresponding node being the next mandatory node of the set of mandatory nodes M of the instance I(S, D, M) that has to be passed through by the vehicle V after having left the start node S of the instance I(S, D, M).

In a step 406, the processing module 10 transforms the vector $O_i$ into a probability vector $P_i$. To do this, in one embodiment, a normalised exponential function ("Softmax function") is applied to each component of the vector $O_i$. A normalised exponential function takes as an input a vector z of K real numbers $z_j$ and generates as an output a vector $\Omega(z)$ of K strictly positive real numbers of sum 1 such that:

$$\Omega(z) = \frac{e^{z_j}}{\sum_{k=1}^{K} e^{z_k}}, \forall j \in \{1, \ldots, K\}$$

At the output of the GCNN (i.e. at the output of the step 406), the processing module 10 obtains, for each node of the graph G, a probability of said node being the next mandatory node of the set of mandatory nodes M of the instance I(S, D, M) that is to be passed through by the vehicle V after having left the start node S of the instance I(S, D, M).

In one embodiment, the instance I(S, D, M) is encoded differently, for example with a different number $NB_A$ of attributes, or with a different number of rows $NB_G$, for example, by showing only the start, destination and mandatory nodes in the vector X.

In one embodiment, the processing module 10 directly encodes the instance I(S, D, M) in the form of a matrix $MAT_i$.

FIG. 5 illustrates schematically a procedure for learning parameters of a graph convolutional neural network.

In a step 501, the processing module 10 generates a learning window F. The learning window F comprises pairs, the window being able to comprise a number of pairs limited to a predefined number q. Each pair associates an instance with a next mandatory node to be visited. In one embodiment, the learning window F is initialised to the empty set and q=50000.

In a step 502, the processing module 10 generates a random instance I(S,D,M).

In a step 503, the processing module 10 applies the method described in relation to FIG. 6 to the random instance I(S,D,M) in order to obtain an ordered list $LO_{RNCG}$ of mandatory nodes to be passed through by the vehicle V between the start node S and the destination node D. The ordered list $LO_{RNCG}$ represents a first order of travel through the mandatory nodes. The method described in relation to FIG. 6 involves the GCNN for defining the ordered list $LO_{RNCD}$.

The step 503 is followed by a step 504 during which the processing module 10 generates an ordered list $LO_{RAND}$ for the random instance I(S,D,M) in which the order of the mandatory nodes of the set of mandatory nodes M is defined randomly. The ordered list $LO_{RAND}$ represents a second order of travel through the mandatory nodes.

In a step 505, the processing module 10 obtains an optimised ordered list $LO_RN_{CG}$ starting from the ordered list $LO_{RNCG}$. To do this, the processing module 10 uses for example the procedure for local optimisation of the order of the mandatory nodes that we describe hereinafter in relation to FIG. 7. During the step 505, the processing module 10 calculates a total transition cost $C_{RNCG}^{opt}$ of the path between the start node and the destination node of the random instance I(S,D,M) generated in the step 502. The total transition cost of a path between a start node and a destination node of an instance of a graph depends on the order of travel through the mandatory nodes of this instance. The total transition cost of a path between a start node and a destination node of an instance of a graph is a sum of the costs of the shortest path between each pair of successive nodes of the instance forming said path. The calculation of the total transition cost $C_{RNCG}^{opt}$ of the path is based on a precalculated table TAB comprising, for each pair of nodes of the graph G, a shortest path connecting the two nodes of said pair and a cost of said shortest path. Each cost of a shortest path is calculated using the transition cost associated with each edge of the graph G used for forming said shortest path. The shortest path between each pair of nodes of the graph G was for example determined using a Dijkstra algorithm described in the document Dijkstra, E. W., "*A note on two problems in connexion with graphs*", Numerische Mathematik, vol. 1, 1959, p. 269-271. The ordered list $LO_{RNCG}^{opt}$ represents a first optimised order of travel through the mandatory nodes.

In a step 506, the processing module 10 obtains an optimised ordered list $LO_{RAND}^{opt}$ starting from the random ordered list $LO_{RAND}$ obtained at the step 504. To do this, the processing module 10 uses for example the procedure for local optimisation of the order of the mandatory nodes that we describe hereinafter in relation to FIG. 7. During the step 506, the processing module 10 calculates a total transition cost $C_{RAND}^{opt}$ of the path between the start node and the destination node of the random instance I(S,D,M) generated during the step 502. As during the step 505, the calculation of the total transition cost $C_{RAND}^{opt}$ of the path is based on the precalculated table TAB. The ordered list $LO_{RAND}^{opt}$ represents a second order of optimised travel through the mandatory nodes.

In a step 507, the processing module 10 compares the cost $C_{RNCG}^{opt}$ with the cost $C_{RAND}^{opt}$. If the cost $C_{RNCG}^{opt}$ is higher than the cost $C_{RAND}^{opt}$, the processing module 10 selects the ordered list $LO_{RAND}^{opt}$ in a step 508. Otherwise the processing module 10 selects the ordered list $LO_{RNCG}^{opt}$ in a step 509. The ordered list selected is then denoted $LO_{SELECT}^{opt}$.

In a step 510, the processing module 10 initialises a variable j to unity.

In a step 511, the processing module initialises a temporary instance i(s,d,m) to the value of the random instance I(S,D,M) generated during the step 502.

In a step 512, the processing module 10 identifies the mandatory node $m_j$ of the set of mandatory nodes m in position j in the selected ordered list $LO_{SELECT}^{opt}$. During the first passage through the step 512, the variable j being equal to 1, the processing module 10 selects the mandatory mode $m_1$ located in the first position in the selected ordered list $LO_{SELECT}^{opt}$.

In a step 513, the processing module 10 saves the pair formed by the temporary instance i(s,d,m) and the mandatory node $m_j$ in the last position of the learning window F. If, before the saving of said pair in the learning window F, the window contained q pairs, the pair located in the first position in the learning window F is deleted from said window. Thus the learning window F always comprises a number q of pairs.

In a step 514, the processing module 10 gives the value $m_j$ to the start node s of the temporary instance i(s,d,m) and removes the mandatory node $m_j$ from the set of mandatory nodes m.

In a step 515, the processing module 10 determines whether the set of mandatory nodes m is empty.

If the set of mandatory nodes m is not empty, the processing module 10 increments the variable j by one unit in a step 516 and returns to the step 512.

If the set of mandatory nodes m is empty, the processing module 10 performs a step 517. During the step 517, the processing module 10 initiates a procedure of iterative training of the GCNN. The iterative training procedure comprises $K_{ITER}$ iterations. In one embodiment, $K_{ITER}$=10000. At each iteration, the processing module 10 randomly selects a number $B_c$ of pairs associating an instance with a next mandatory node to be visited in the learning window F. In one embodiment, the number of pairs $B_c$=32. For each pair selected, the processing module 10 applies the GCNN to the instance represented in the pair as described in relation to FIG. 4 by adjusting (i.e. by learning according to the terminology of neural networks) parameters of the GCNN so that the mandatory node of the pair is associated with the highest probability of being the next mandatory node to be visited. The trained parameters are the weights of each matrix of weights $W^{(l)}$ used in the GCNN and the weights used during the linear combination phase of the step 405. Each iteration of the procedure of training the parameters of the GCNN comprises a minimisation of a cost function H(θ) by stochastic gradient descent, θ being all the parameters of the GCNN to be learnt.

$$H(\theta) = \frac{1}{B_c} \sum_{i=1}^{B_c} \sum_{j=1}^{NB_G} -t_{i,j} \cdot \log(f(X_i, \theta)_j)$$

where $NB_G$ is the number of nodes in the graph G, $t_{i,j}$ is a variable that is equal to 1 if for the instance number i the next mandatory node to be visited is the node of the graph G of index j, and 0 otherwise. $X_i$ is the vector resulting from an encoding of the instance number i as described in relation to the step 401. The instance number i is an instance corresponding to one of the $B_c$ pairs selected randomly in the learning window F, the next mandatory node to be visited being the node associated with the instance number i in said pair. The instances of the learning window F are instances considered to be resolved on which the learning procedure is based for learning the parameters of the neural network. The component $\Sigma_{j=1}^{NB_G} -t_{i,j} \cdot \log(f(X_i, \theta)_j)$ of the cost function H(θ) represents an error by the GCNN in predicting the next mandatory node to be passed through corresponding to the instance number i. The cost function H(θ) is therefore a mean of errors by the GCNN in predicting the next nodes to be passed through for a set of $B_c$ instances. During the first iteration of the procedure for learning parameters of the GCNN (and therefore during the first iteration of the procedure for training the parameters of the GCNN), the processing module 10 uses parameters of the GCNN determined randomly for starting the stochastic gradient descent. During following iterations of the procedure for learning parameters of the GCNN or of the procedure for training the parameters of the GCNN, the processing module 10 initialises the stochastic gradient descent with the parameters of the GCNN determined during the last execution of the procedure for training the parameters of the GCNN.

The step 517 is followed by a step 518 during which the processing module 10 determines whether a condition for stopping the procedure for learning the parameters of the GCNN is met. In one embodiment, the stop condition is a maximum duration of execution of the procedure for learning parameters of the GCNN. If at the step 518 this maximum duration is reached, the procedure for learning the parameters of the GCNN stops in a step 519. Otherwise the processing module 10 returns to the step 502. In one embodiment, the maximum duration is equal to 24 hours.

At the end of the procedure for learning parameters of the GCNN, the GCNN is considered to be trained.

FIG. 6 illustrates schematically an iterative procedure for determining an order of travel through the mandatory nodes for an instance of a graph based on the GCNN described in relation to FIG. 4. The method of FIG. 6 is used in the learning procedure described in relation to FIG. 5, but also, once the learning has been performed, for determining an order of the mandatory nodes for an instance during the step 31.

In a step 3100, the processing module 10 obtains a current instance to be resolved $I_c(S_c, D_c, M_c)$. During the step 503, the current instance $I_c(S_c, D_c, M_c) = I(S, D, M)$. During the step 31, the current instance $I_c(S_c, D_c, M_c) = I_R(S_R, D_R, M_R)$.

In a step 3101, the processing module 10 determines whether the set of mandatory nodes $M_c$ is empty. If such is the case, the step 3101 is followed by a step 3102 during which the processing module 10 generates an empty ordered list $LO_{RNCG}$ and ends the step 503.

If the set of mandatory nodes M, is not empty, the processing module 10 determines, in a step 3103, whether the set of mandatory nodes $M_c$ contains an mandatory node (i.e. whether the cardinal of the set of mandatory nodes $M_c$ is equal to 1). If the set of mandatory nodes $M_c$ contains only one mandatory node, the processing module 10 generates an ordered list $LO_{RNCG}$ containing only this mandatory node and ends the step 503.

If the set of mandatory nodes $M_c$ contains a plurality of mandatory nodes, the processing module 10 initialises a temporary instance $i_c(s_c, d_c, m_c)$ to the value of the current instance $I_c(S_c, D_c, M_c)$ during a step 3105.

In a step 3106, the processing module 10 initialises a variable j to unity.

In a step 3107, the processing module 10 applies the GCNN described in FIG. 4 to the temporary instance $i_c(s_e, d_e, m_e)$. Applying the GCNN to the temporary instance $i_c(s_c, d_c, m_c)$ makes it possible to obtain a probability vector associating a probability value with each node of the graph G.

In a step 3108, the processing module 10 determines the mandatory node $m_{c_j}$ of the set of mandatory nodes $m_c$ having the highest probability of being the next mandatory node to be passed through following the start node $s_c$. The processing module 10 then inserts the mandatory node $m_{c_j}$ in the ordered list $LO_{RNCG}$ of mandatory nodes in a step 3109.

In a step 3110, the processing module 10 gives to the start node 5, of the temporary instance $i_c(s_c, d_c, m_c)$ the value of the mandatory node $m_{c_j}$ and removes the mandatory node $m_{c_j}$ from the set of mandatory nodes $m_c$.

In a step 3111, the processing module 10 determines whether the number of mandatory nodes remaining in the set of mandatory nodes $m_c$ is equal to unity. If such is the case, the processing module 10 adds the mandatory node remaining at the end of the ordered list $LO_{RNCG}$ in a step 3113. At this step, all the mandatory nodes of the instance $I_c(S_c, D_c, M_c)$ appear in the ordered list $LO_{RNCG}$ in the order proposed by the GCNN. The ordered list $LO_{RNCG}$ is then information representing an order of travel through mandatory nodes of the set of mandatory nodes $M_c$ of the instance $I_c(S_c, D_c, M_c)$.

If the number of mandatory nodes remaining in the set of mandatory nodes m, is greater than unity, the processing module 10 increments the variable j by one unit during a step 3112 and returns to the step 3107. The processing module 10 therefore starts again with a new instance having as its start node $s_c$ the mandatory node $m_{c_j}$ determined during the previous situation, as its destination node the same node $d_c$ as in the previous iteration and a list of mandatory nodes $m_c$ identical to the previous one from which $m_{c_j}$ was deleted.

Figure 7:
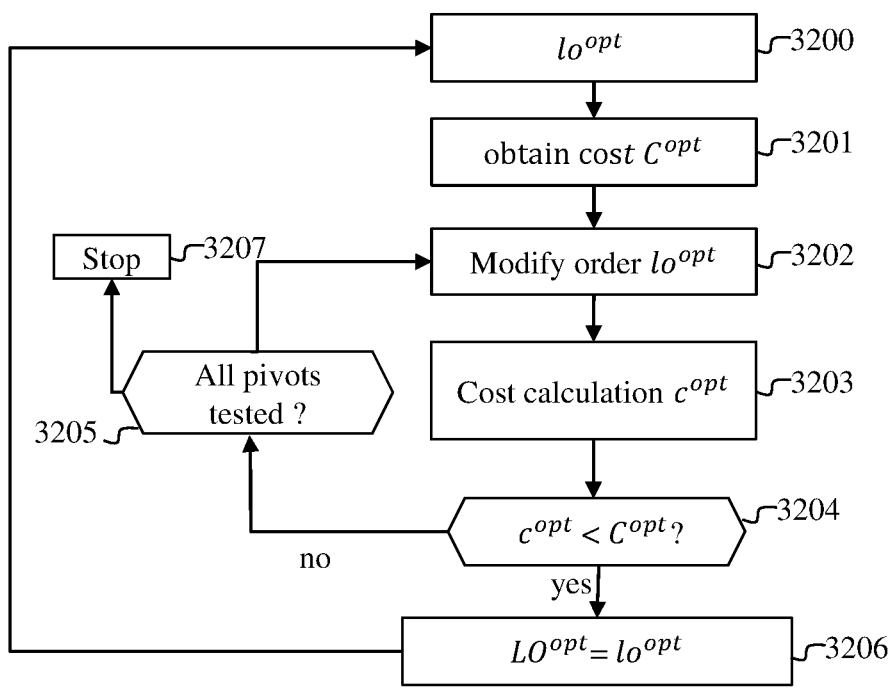
FIG. 7 illustrates schematically a procedure for local optimisation of an order of the mandatory nodes.

FIG. 7 illustrates schematically an example of a procedure for local optimisation of the order of the mandatory nodes. The procedure in FIG. 7 is therefore a local optimisation procedure. Initialising this procedure by an order of travel through mandatory nodes obtained by a neural network adapted to the graph G makes it possible to obtain almost systematically an order of travel through mandatory nodes better than by initialising said procedure with an order of travel through mandatory nodes defined randomly.

The procedure for local optimisation of the order of the mandatory nodes is used during the steps 505, 506 and 32. This procedure receives as an input an instance $I^{opt}(S^{opt}, D^{opt}, M^{opt})$ and an ordered list to be optimised $LO^{opt}$.

In a step 3200, the processing module 10 creates a variable ordered list $lo^{opt}$.

In a step 3201, the processing module 10 calculates a total transition cost $C^{opt}$ of the path between the start node $S^{opt}$ and the destination node $D^{opt}$ of the random instance $I^{opt}(S^{opt}, D^{opt}, M^{opt})$ taking into account the order of the mandatory nodes of the ordered list $LO^{opt}$. The calculation of the total transition cost $C^{opt}$ of the path is based on the precalculated table TAB.

In a step 3202, the processing module 10 changes the order in the ordered list $LO^{opt}$ and saves the ordered list obtained in the variable ordered list $lo^{opt}$. During the step 3202, the processing module 10 determines a pair of elements, referred to as pivot elements, in the ordered list $LO^{opt}$ and inverts the elements of the ordered list $LO^{opt}$ located between the two pivot elements symmetrically. The pair of pivot elements determined is different from all pairs of pivot elements already used for the ordered list $LO^{opt}$. From the ordered list $LO^{opt}$ a variable ordered list $lo^{opt}$ in which the elements of the ordered list $LO^{opt}$ located between the two pivot elements were inverted symmetrically is then obtained.

In a step 3203, the processing module 10 calculates a total transition cost $c^{opt}$ of the path between the start node $S^{opt}$ and the destination node $D^{opt}$ of the random instance $I^{opt}(S^{opt}, D^{opt}, M^{opt})$ taking into account the order of the mandatory nodes of the variable ordered list $lo^{opt}$ obtained during the step 3202.

In a step 3204, the processing module 10 compares the total transition cost $C^{opt}$ with the total transition cost $C^{opt}$. If $c^{opt} < C^{opt}$, during a step 3206, the processing module 10 modifies the ordered list $LO^{opt}$ in the following manner:

$$LO^{opt} = lo^{opt}$$

A new ordered list $LO^{opt}$ for which no pair of pivot elements has been tested is then obtained. The step 3206 is then followed by the step 3200.

Otherwise the processing module 10 checks, in a step 3205, whether all the possible pairs of pivot elements of the ordered list $LO^{opt}$ have been tested. If all the possible pairs of pivot elements of the ordered list $LO^{opt}$ have been tested, the processing module 10 ends the iterative procedure for optimisation of an order of mandatory nodes in a step 3207. Otherwise the processing module 10 returns to the step 3202.

In one embodiment, during the step 3205, the processing module 10, in addition to testing whether all the possible pairs of pivot elements of the ordered list $LO^{opt}$ have been tested, tests a stop condition. The stop condition is here a predetermined duration of execution of the iterative procedure for optimising an order of mandatory nodes. In one embodiment, this predetermined duration is equal to 60 seconds. The procedure for optimising an order of mandatory nodes stops when the predetermined duration has been reached. At the end of this procedure, the last ordered list $LO^{opt}$ obtained is the optimised ordered list.

The invention claimed is:

1. A method for defining a path to be followed by a vehicle in an environment represented by a graph of nodes connected by edges, each node of said graph representing a position that can be adopted by said vehicle, each edge between two nodes being associated with a transition cost between the two nodes, comprising:

obtaining an instance of said graph, referred to as an instance to be resolved, each instance being represented by a start node, a destination node and a set of mandatory nodes through which the vehicle must pass, said start, destination and mandatory nodes forming the nodes of the instance to be resolved;

obtaining information representing an initial order of travel through said mandatory nodes by applying a procedure, using a graph convolutional neural network, referred to as a GCNN, adapted to said graph, to said instance to be resolved;

executing a procedure of local optimisation of the order of the mandatory nodes in order to obtain an optimised order of the mandatory nodes, said procedure being initialised with said information representing the initial order;

defining a path for said instance to be resolved from the optimised order of the mandatory nodes and, for each pair of nodes of said instance to be resolved, from a shortest path between the nodes of said pair; and controlling movements of the vehicle using the defined path.

2. The method according to claim 1, wherein the procedure using the GCNN is an iterative procedure taking an instance of the graph as an input, referred to as the input instance, and generating information representing an initial order of travel through the mandatory nodes of the input instance as an output, referred to as output information, and comprising, at each iteration:

applying the GCNN to said input instance in order to obtain, for each node of the graph, a value representing a probability of being the next mandatory node to be passed through following the start node of the input instance;

identifying the mandatory node in the set of mandatory nodes of the input instance having the highest probability;

inserting the mandatory node identified in an ordered list of mandatory nodes;

replacing the start node of the input instance with the mandatory node identified and removing the mandatory node identified from the set of mandatory nodes of the input instance;

the iterations ending when a number of nodes in the set of mandatory nodes of the input instance is equal to one, the mandatory node remaining in the set of mandatory nodes of the input instance being inserted in said ordered list and said ordered list forming the output information.

3. The method according to claim 1, wherein the procedure for local optimisation of the order of mandatory nodes is an iterative procedure taking an instance, referred to as the initial instance, and information representing an order of mandatory nodes, referred to as the initial order, as an input and generating information representing an optimised order of mandatory nodes as an output, referred to as the optimised order, each item of information representing an order of mandatory nodes being a list of ordered mandatory nodes, and comprises at each iteration:

determining a pair of mandatory nodes, referred to as pivot nodes, among the mandatory nodes of the ordered list of mandatory nodes of the initial order, referred to as the initial list, and obtaining a modified ordered list of mandatory nodes, referred to as the modified list, wherein the mandatory nodes of the initial list located between the two pivot nodes have been inverted symmetrically, the pair of pivot nodes determined being different from all pairs of pivot nodes already used for modifying the order of the mandatory nodes in the initial list;

defining information representing the order of the mandatory nodes in the modified list as being a temporary optimised order when a total transition cost of a path between the start and destination nodes of the initial instance following the order of the mandatory nodes in the modified list is lower than a total transition cost of said path following the order of the mandatory nodes in the initial list; and defining the temporary optimised order as being the initial order;

ending the iterations of the local optimisation procedure when a stop condition is fulfilled, the optimised order being the last temporary optimised order obtained by the local optimisation procedure.

4. The method according to claim 1, wherein the GCNN was adapted to said graph during a prior adaptation phase, the prior adaptation phase comprising a learning procedure for adapting parameters of a convolution phase and of a linear combination phase of said GCNN, referred to as GCNN parameters, the learning procedure being an iterative procedure comprising at each iteration:

generating a random instance of the graph;

applying the procedure using the GCNN to the random instance in order to obtain a first item of information representing an order of the mandatory nodes of the random instance, referred to as a first item of information;

generating a second item of information representing an order of the mandatory nodes of the random instance defined randomly, referred to as a second item of information;

obtaining a first and a second item of information representing an order of the optimised mandatory nodes, referred to as first and second optimised items of information, by applying the local optimisation procedure respectively to the order of the mandatory nodes corresponding to the first and second items of information;

selecting the order represented by said first or by said second optimised item of information making it possible to minimise a total transition cost of a path between the start and destination nodes of the random instance;

forming a new instance from each mandatory node of the random instance, each new instance having as its start node the mandatory node corresponding to the new instance, as its destination node the destination node of the random instance and as a set of mandatory nodes the nodes following the mandatory node used as the start node of the new instance in the selected order; and, for the random instance and each new instance, forming a pair by associating said instance with a next mandatory node to be passed through for said instance, said next mandatory node to be passed through being the mandatory node following the start node of said instance in the selected order;

updating a learning window with the pairs thus formed;

changing the parameters of the GCNN to minimise an error in prediction by the GCNN of a next mandatory node to be passed through using the next mandatory node of pairs of the learning window as a reference of next mandatory nodes to be passed through to be obtained by the GCNN.

5. A non-transitory storage medium storing a computer program comprising instructions for executing, by a device, the method according to claim 1, when said program is executed by a processor of said device.

6. A device for defining a path to be followed by a vehicle in an environment represented by a graph of nodes connected by edges, each node of said graph representing a position that can be adopted by said vehicle, each edge between two nodes being associated with a transition cost between the two nodes, comprising at least one processor configured to:

obtain an instance of said graph, referred to as an instance to be resolved, each instance being represented by a start node, a destination node and a set of mandatory nodes through which the vehicle must pass, said start, destination and mandatory nodes forming the nodes of the instance to be resolved;

obtain information representing an initial order of travel through said mandatory nodes by applying a procedure, using a graph convolutional neural network, referred to as a GCNN, adapted to said graph, to said instance to be resolved;

execute a procedure of local optimisation of the order of the mandatory nodes in order to obtain an optimised order of the mandatory nodes, said procedure being initialised with said information representing the initial order;

define a path for said instance to be resolved from the optimised order of the mandatory nodes and, for each pair of nodes of the instance to be resolved, from a shortest path between the nodes of said pair; and control movements of the vehicle using the defined path.

7. The device according to claim 6, wherein said procedure for local optimisation of the order of the mandatory nodes is an iterative procedure taking an instance, referred to as an initial instance, and information representing an order of mandatory nodes, referred to as an initial order, as an input and generating information representing an optimised order of mandatory nodes as an output, referred to as an optimised order, each item of information representing an order of mandatory nodes being a list of ordered mandatory nodes, and comprises at each iteration:

determining a pair of mandatory nodes, referred to as pivot nodes, among the mandatory nodes of the ordered list of mandatory nodes of the initial order, referred to as an initial list, and obtaining a modified ordered list of mandatory nodes, referred to as a modified list, wherein the mandatory nodes of the initial list located between the two pivot nodes have been inverted symmetrically, the pair of pivot nodes determined being different from all pairs of pivot nodes already used for modifying the order of the mandatory nodes in the initial list;

defining information representing the order of the mandatory nodes in the modified list as being a temporary optimised order when a total transition cost of a path between the start and destination nodes of the initial instance following the order of the mandatory nodes in the modified list is less than a total transition cost of said path following the order of the mandatory nodes in the initial list; and defining the temporary optimised order as being the initial order; and ending the iterations of the local optimisation procedure when a stop condition is fulfilled, the optimised order being the last temporary optimised order obtained by the local optimisation procedure.

8. A vehicle comprising a device according to claim 6.

* * * * *